Dec. 28, 1965     H. E. RIORDAN     3,225,820
DEVICE FOR CONTROLLING TEMPERATURE BY HEAT CONDUCTION
Filed Nov. 1, 1962     2 Sheets-Sheet 1

Hugh E. Riordan
*INVENTOR*

BY *S. A. Giarratana*
*Francis H. Masselle*
attorneys

Dec. 28, 1965     H. E. RIORDAN     3,225,820
DEVICE FOR CONTROLLING TEMPERATURE BY HEAT CONDUCTION
Filed Nov. 1, 1962     2 Sheets-Sheet 2

Hugh E. Riordan
INVENTOR

BY S. A. Giarratana

Francis R. Masselle
attorneys

United States Patent Office 3,225,820
Patented Dec. 28, 1965

3,225,820
DEVICE FOR CONTROLLING TEMPERATURE BY HEAT CONDUCTION
Hugh E. Riordan, Wyckoff, N.J., assignor to General Precision, Inc., Little Falls, N.J., a corporation of Delaware
Filed Nov. 1, 1962, Ser. No. 234,799
8 Claims. (Cl. 165—26)

The present invention relates to a device for controlling the operating temperature of electronic component packages, and more particularly to the device for maintaining the operating temperature of a component package constant by controlling the rate at which heat generated by the package itself is allowed to dissipate to a heat sink.

Prior to the present invention the operating temperature of sensitive equipment, such as electronic component packages for missile guidance systems, was controlled by a variable heating element within the component package. The heating element element was automatically controlled to maintain the operating temperature of the equipment within the component package at a constant temperature over the full range of environmental temperatures encountered. However, in many applications limitations on permissible heater power do not permit control of the operating temperature over the full range of environmental temperatures by such a variable heating element.

In accordance with the present invention, a device is provided for stabilizing the operating temperature of a component package without the use of heater power. This is accomplished by connecting the component package to a heat sink by a variable thermal resistance device which varies the resistance to the dissipation of heat generated by the package itself to the heat sink. The device is automatically controlled by the temperature of the heat sink itself so that its resistance is increased as the temperature of the heat sink decreases. In one embodiment of the invention the heat from the component package is transmitted to the heat sink through a gap in a gaseous or liquid medium with a bimetallic element being provided to vary the width of the gap in response to temperature changes in the heat sink. In another embodiment of the invention a bimetallic element provides the thermal connection between the component package and heat sink and varies the effective contact area for thermal transmission between the component package and the heat sink in response to temperature changes in the heat sink.

Accordingly, it is one object of the invention to provide a device for controlling the operating temperature of a component package.

It is another object of the invention to provide a device for controlling the operating temperature of a component package without using a separate variable heating unit or permitting the use of a heating unit of lesser capacity than otherwise possible.

It is a further object of the invention to provide a device for controlling the operating temperature of a component package by controlling the thermal resistance to the dissipation of heat from the component package to a heat sink.

It is a still further object of the invention to provide a device for controlling the operating temperature of a component package wherein a thermal conduction gap is provided between the component package and the heat sink and the width of the gap is varied in response to temperature changes of the heat sink to control the rate at which the heat generated by the package is dissipated to the heat sink.

It is a still further object of the invention to provide a device for controlling the operating temperature of a component package wherein a temperature responsive element is positioned between the component package and a heat sink to thermally conduct the heat generated by the component package to the heat sink, the area contact of the temperature responsive element varying in response to temperature changes of the heat sink to control the thermal resistance to the dissipation of heat from the component package.

It is a still further object of the invention to provide a device for controlling the operating temperature of a component package which is simple, economical, reliable and effective in use.

Other objects and features of novelty of the present invention will be specifically pointed out or will otherwise become apparent when referring, for a better understanding of the invention, to the following description taken in conjunction with the accompanying drawings, wherein.

Figure 1:
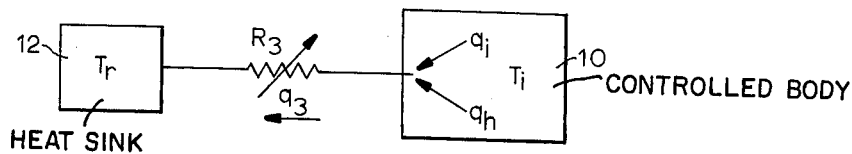
FIG. 1 is a schematic diagram illustrating the principle of the present invention.

Referring to FIG. 1, a body which generates heat is shown, represented for sake of example by a component package 10 containing electronic components which dissipate self generated heat at a rate $q_1$. In prior devices the component package was accompanied by controllable heaters which produced a heat flow $q_h$ of sufficient magnitude to maintain the temperature of the component package constant at $Ti$ while the temperature $Tr$ of a heat sink 12 varied widely in an uncontrolled manner. In these prior devices, the heat sink was connected to the component package by supporting elements having a constant thermal resistance $R_3$. Consequently, the rate $q_3$ at which the heat was dissipated from the component package to the heat sink also varied widely.

In accordance with the present invention the fixed thermal resistance $R_3$ between the component package and the heat sink is changed to a variable resistance which varies in response to the variation in the temperature $Tr$ of the heat sink in such a way as to tend to maintain $q_3$ constant and thus maintain $Ti$ constant without the aid of a controllable heater unit or with a unit of lesser capacity than would otherwise be required. In this arrangement it is assumed that the temperature of the heat sink $Tr$ is always less than the temperature of the component package $Ti$. When the temperature of the heat sink increases the thermal resistance $R_3$ is reduced and when the temperature of the heat sink decreases, the thermal resistance $R_3$ is increased. The equations for this system wherein $R_0$ is the thermal resistance of the component package are:

(1) $\quad R_3 = R_0 - KTr$
(2) $\quad Ti - Tr = q_3 R_3$
(3) $\quad q_3 = q_i + q_h$ Substituting (1) and (3) in (2)

(4) $\quad q_h = \dfrac{(Ti - Tr)}{(R_0 - KTr)} - q_i$ if $q_h = 0$ (5) $\quad Ti = q_i R_0 + Tr(1 - Kq_i)$ If $Ti$ is constant, the derivative of (5) with respect to $Tr=0$, hence, (6) $$K=\frac{1}{q_i}$$

Thus in the assumed case it is possible to stabilize the temperature of the component package without the use of heater power. Where the range of control of $R_3$ is inadequate to cope with variations of $Tr$, auxiliary heating can be supplied if necessary by controllable heaters energized automatically when the resistance $R_3$ reaches its maximum limit. However, the heater power required in such an event would be far less than if such heaters were depended upon alone to cover the full range of variations in $Tr$.

The required value of $R_0$ is found by substituting (6) in (5)

(7) $$R_0=\frac{Ti}{q_i}$$

Figure 2:
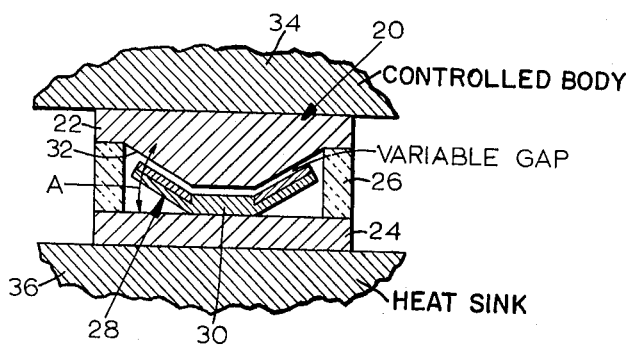
FIG. 2 is a sectional view of one embodiment of the present invention.

There are a number of ways of mechanizing Equation 1. For example, if the package were held at a constant internal gas pressure, variable forced convection could be used. Another approach which could be used would be to take advantage of the change in thermal resistance which occurs between the liquid and solid states of some substances. Still another approach is illustrated in FIG. 2 wherein a device 20 is illustrated which provides the variable resistance $R_3$ of FIG. 1 by a variable air gap. The device 20 comprises a housing, having top and bottom walls 22 and 24 spaced apart by a side wall 26. A cup-shaped bimetallic assembly 28 is positioned within the housing with a central portion 30 thereof connected to the bottom wall 24. The top wall 22 has a contoured portion 32 which projects downwardly into the bimetallic assembly and cooperates therewith to define an air gap which is varied when the periphery of the bimetallic assembly moves toward or away from the contoured portion 32, as indicated by the arrow A, in response to temperature changes in a heat sink as will be described.

The top and bottom walls 22 and 24 are made of a good thermal conducting material and the side wall 26 is made of a good thermal insulating material, so that when the device 20 is positioned between a body 34 to be controlled, such as a component package, and a heat sink 36, the heat generated by the controlled body will be dissipated through the top wall 22 across the variable air gap, through the bimetallic assembly 26 and bottom wall 24 to the heat sink. When the temperature of the heat sink 36 increases, the periphery of the bimetallic assembly 28 moves closer to the contoured portion 32 to narrow the variable air gap, and when the temperature of the heat sink decreases, the periphery of the bimetallic assembly moves away from the contoured portion 32 to widen the variable air gap. The arrangement is preferably such that the variation of the air gap tends to maintain the rate of heat dissipation $q_3$ constant which in turn, tends to maintain the temperature $Ti$ of the controlled body 34 constant when heat produced therein is generated at a substantially constant rate. In the particular embodiment illustrated in FIG. 2 a thermal resistance varying from 3 to 10 degrees per watt can be obtained with suitable materials by employing a geometry in which the air gap is varied from approximately .002 inch to .007 inch in air at a pressure above 1 mm. mercury with a total area for the air gap of approximately 4¾ square inches.

Figure 3:
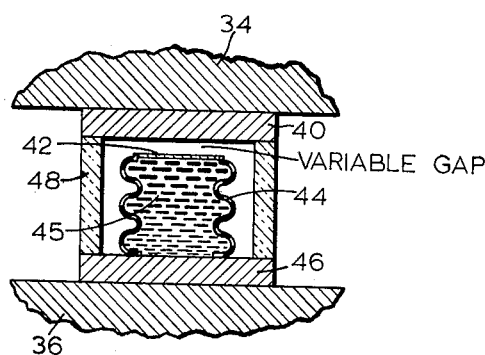
FIG. 3 is a sectional view of another embodiment of the invention.

Referring to FIG. 3, another embodiment of the invention is illustrated which is similar to that of FIG. 2 except that the variable air gap is formed between a flat thermal conducting top wall 40 and an end plate 42 closing off the upper end of a bellows 44 secured to a bottom thermal conducting wall 46 spaced from the top wall 40 by a side wall 48 of thermal insulating material. The bellows 44 is filled with a thermally expansive medium 45 such as a wax or a suitable liquid or gas which expands and contracts in response to increasing and decreasing variations in the temperature of the heat sink 36. The bellows 44 expands and contracts with the expansive medium 45 to vary the air gap in a manner to control the resistance to the dissipation of heat from the controlled body 34 through the top wall 40 across the variable air gap through the thermal conducting end plate 42 and thermally conducting bellows 44, and through the bottom wall 46 to the heat sink. In each of the embodiments illustrated in FIGS. 2 and 3 the devices are filled with air at a pressure above 1 mm. mercury as previously mentioned, but they can also be filled with other suitable gaseous mediums or with a liquid.

Figure 4:
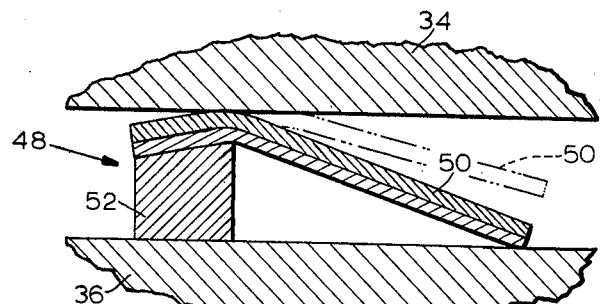
FIG. 4 is a sectional view of still another embodiment of the invention.
Figure 5:
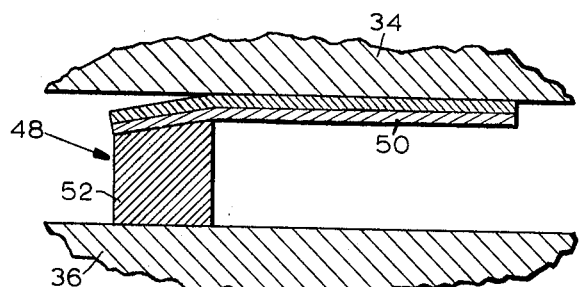
FIG. 5 is a sectional view of the structure illustrated in FIG. 4 with the temperature responsive element in position to provide a maximum contact area.

Referring to FIGS. 4 and 5, a device 48 illustrating another embodiment of the invention is shown comprising a bimetallic element 50 fixed between the controlled body 34 and a thermal conducting support 52 which contacts the heat sink 36 directly. The rate at which heat is dissipated from the controlled body is controlled by the area contact between the body and the bimetallic element 50. In FIG. 4 the minimum contact area position is illustrated which offers maximum resistance to the dissipation of heat from the controlled body to the heat sink. As the temperature of the heat sink increases, the right end of the bimetallic element 50 moves upwardly to progressively increase its contact area with the controlled body 34 until it reaches a position of maximum contact area as illustrated in FIG. 5. In this position it offers the least resistance to the dissipation of heat from the controlled body to the heat sink. An intermediate position of bimetallic element 50 is shown in broken line in FIG. 4.

Figure 6:
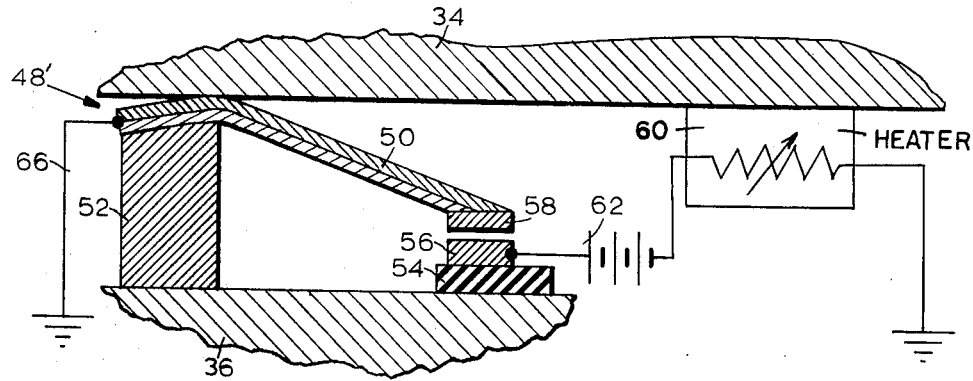
FIG. 6 is a view of the FIG. 4 embodiment modified and incorporated in a schematically shown system comprising an auxiliary heat source.

As previously mentioned, the invention is applicable to systems incorporating both a variable thermal resistance and an auxiliary controllable heater. Such a system is shown in FIG. 6, utilizing a variable thermal resistance device 48' which is fundamentally the same as that illustrated in FIGS. 4 and 5 and, therefore, need not be described in detail.

Positioned on heat sink 36 beneath the free end of bimetallic element 50 is a pad 54 of electrically non-conductive material supporting a contact button 56 which, in conjunction with another contact button 58 on the end of the bimetallic element, makes up a single pole, single throw switch.

A controllable heater, diagrammatically shown at 60, and a power source, represented by battery 62, are connected in series circuit through conductor 64 bimetallic element 50, and conductor 66, the circuit being complete when the bimetallic element is in its lowermost position so that contact 58 closes on contact 56. Thus, the activation of controllable heater 60 coincides with the attainment of the maximum thermal resistance condition of device 48'. Separate, conventional means, not shown, can be provided to regulate the thermal output of heater 60 as required. While a direct switching system is shown in the interests of simplicity, it will be appreciated that a switching relay may be interposed to avoid passing substantial electrical currents through bimetallic element 50 and contacts 56, 58.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed:

1. In combination, a controlled body including a source of heat, generated at substantially constant rate, a heat sink having an uncontrolled temperature which is normally lower than the permissible operating temperature of the controlled body, and variable thermal resistance means thermally connecting said controlled body to said heat sink for dissipating the heat from the controlled body to the heat sink at a controlled rate, said variable thermal resistance means being controlled by the temperature of said heat sink, the thermal resistance of said variable thermal resistance increasing when the temperature of the heat sink decreases and decreasing when the temperature of the heat sink increases.

2. The invention as defined in claim 1 wherein the variable thermal resistance varies in a manner to maintain the rate of dissipation of heat from said controlled body substantially constant whereby the operating temperature of said controlled body is maintained substantially constant.

3. In combination, a controlled body including a source of heat, generated at substantially constant rate, a heat sink having an uncontrolled temperature which is normally lower than the permissible operating temperature of the controlled body, and variable thermal resistance means thermally connecting said controlled body to said heat sink for dissipating the heat from the controlled body to the heat sink at a controlled rate, said variable thermal resistance means being controlled by the temperature of said heat sink, said variable thermal resistance means comprising first and second thermally conducting walls engaging said controlled body and heat sink respectively and fixedly spaced apart by a thermal insulating wall in a manner to define an enclosed cavity therebetween, and a temperature responsive element within said cavity engaging said second wall and cooperating with said first wall to define a variable gap therebetween, said temperature responsive element varying the width of said gap in response to temperature changes in said heat sink to control the rate at which heat is dissipated across the gap.

4. The invention as defined in claim 3 wherein the width of said variable gap decreases as the temperature of the said heat sink increases and increases as the temperature of said heat sink decreases.

5. In combination, a controlled body including a source of heat, generated at substantially constant rate, a heat sink having an uncontrolled temperature which is normally lower than the permissible operating temperature of the controlled body, and variable thermal resistance means thermally connecting said controlled body to said heat sink for dissipating the heat from the controlled body to the heat sink at a controlled rate, said variable thermal resistance means being controlled by the temperature of said heat sink, said variable thermal resistance means comprising bimetallic means thermally connected between said heat sink and controlled body and engaging at least one of the two with a variable contact area, said contact area increasing as the temperature of the said heat sink increases and decreasing as the temperature of the said heat sink decreases.

6. A variable thermal resistance device comprising first and second walls of thermally conductive material fixedly spaced apart by a side wall of thermally insulative material to define an enclosed cavity, an expandable bellows positioned within said cavity having one end thereof thermally connected to said first wall with the other end thereof closed off by an end plate of thermally conductive material, said end plate being positioned adjacent to said second wall to define a variable gap therebetween, and a thermally expansive medium filling said expandable bellows to vary the width of said gap in response to temperature changes experienced by said first wall.

7. In combination, a controlled body including a source of heat, generated at a substantially constant rate, a heat sink of uncontrolled temperature normally lower than the permissible operating temperature in the controlled body, and a variable thermal resistance device comprising a member made of a thermal conducting material connected to said heat sink and a bimetallic temperature responsive element connected to said member and engaging the surface of said controlled body with a variable contact area which varies directly with heat sink temperature.

8. A temperature control system comprising: a controlled body; heater means operable to supply heat to said body; a heat sink of uncontrolled temperature normally lower than that of said body; a variable thermal resistant device, inversely responsive to the temperature of said sink, interposed in thermally conductive relation between said body and heat sink; said variable resistance device including a temperature responsive member in a continuous heat conductive relation with said heat sink; and switching means effective upon the attainment of a condition of maximum thermal resistance by said device to render operative said heater means.

References Cited by the Examiner

UNITED STATES PATENTS

| | | | |
|---|---|---|---|
| 1,649,506 | 11/1927 | Brewer | 236—1 X |
| 1,703,803 | 2/1929 | Widstrom | 236—1 |
| 2,363,375 | 11/1944 | Wild | 165—30 X |
| 2,451,903 | 10/1948 | Bauman | 165—96 X |
| 2,949,283 | 8/1960 | Smith | 165—32 |
| 3,093,308 | 6/1963 | Snelling | 236—1 |

FOREIGN PATENTS 366,927  2/1932  Great Britain.

ALDEN D. STEWART, *Primary Examiner.*

CHARLES SUKALO, *Examiner.*